Sept. 17, 1929.  C. G. BUTLER  1,728,528
FLUID PRESSURE ROTOR
Filed Feb. 21, 1928
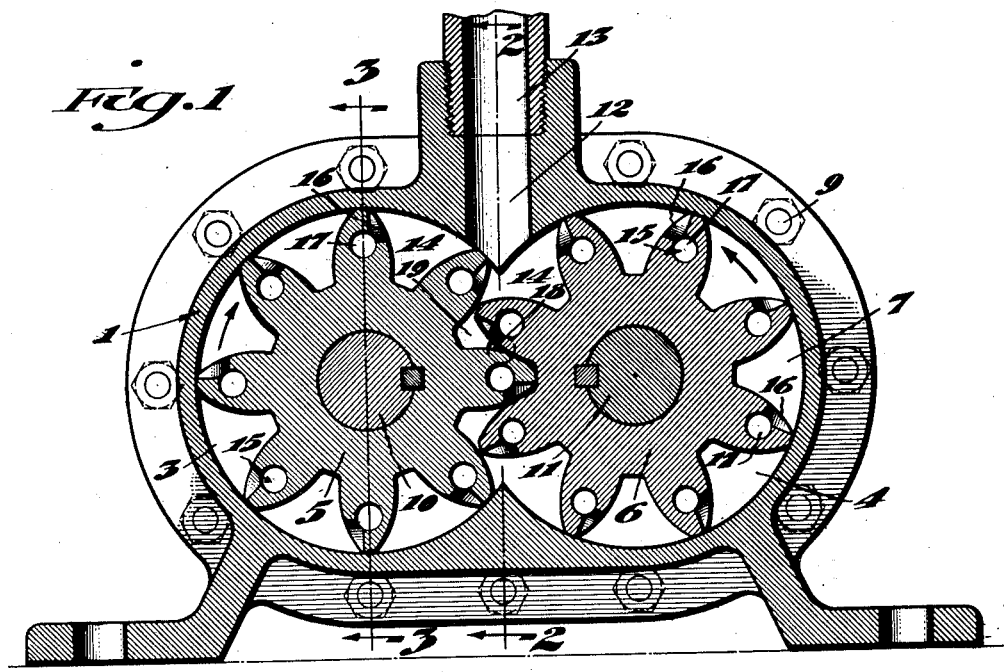
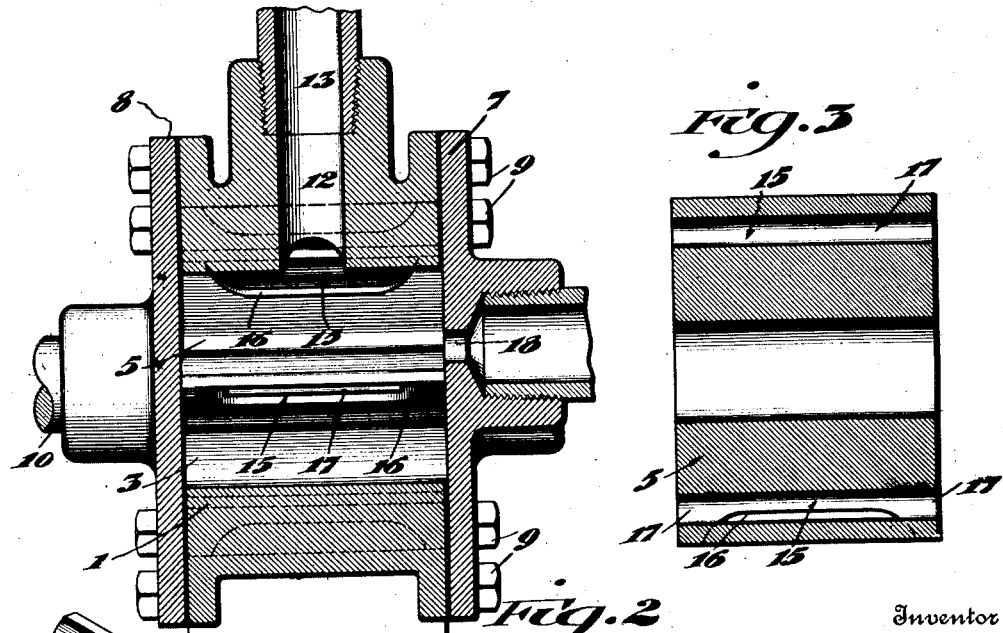
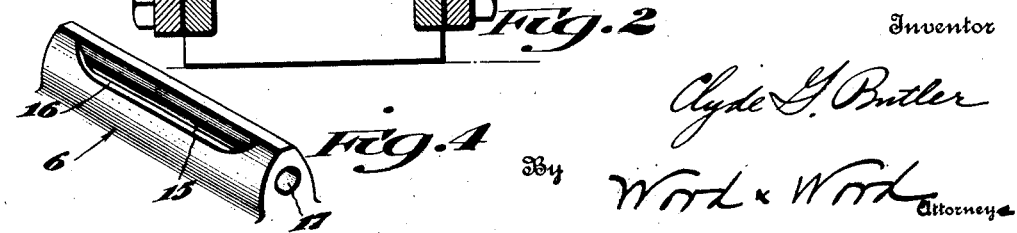
Inventor
Clyde G. Butler
By Wood & Wood
Attorneys Patented Sept. 17, 1929

1,728,528

UNITED STATES PATENT OFFICE

CLYDE G. BUTLER, OF CINCINNATI, OHIO, ASSIGNOR TO THE CINCINNATI BALL CRANK COMPANY, OF CINCINNATI, OHIO, A CORPORATION OF OHIO

FLUID-PRESSURE ROTOR

Application filed February 21, 1928. Serial No. 256,049.

This invention relates to a novel machine or mechanical movement organization in the nature of a fluid pressure rotor providing an instrumentality which can be selectively employed either for translating rotary power into fluid pressure or, conversely, fluid pressure into rotary power.

The object of this invention is to provide a machine of this nature which shall be characterized by extreme simplicity of structure and organization, economy of manufacture, efficiency of operation, high durability, not requiring the employment of elaborate or complicated mechanism or parts needing frequent adjustment or replacement, and being adaptable to a very wide range of uses from the circumstance that this mechanism is operable in relation to many different characters and pressures of fluid medium.

Before proceeding to make the disclosure in relation to the drawings which necessarily explains the invention in relation to a single embodiment, it will be helpful to first outline a generic disclosure of the underlying principle.

My invention, therefore, in its broader aspect, contemplates the use of a pair of intermeshing gears formed with fluid passageways or conduits extending from a circumferential or tooth portion of one or both gears to an end or face portion thereof. These fluid conduits extending through the gears are arranged to rotatively coact with ports in the enclosing casing to transmit fluid to or from said ports respectively. The gear rotation intermediate said casing ports provides a series of successively presented compartments between gear teeth in the zone of their intermesh, each compartment traversed by the meshing tooth and thereby constituting a transient fluid pressure chamber in communication through the gearing passageways, with one or the other of said casing ports according to the direction of gear rotation. It will thus be seen that I have provided a rotor which operates as a pump when said gears are driven and said fluid pressure chambers are in communication with the end openings of the passageways for the outlet of the fluid, or as a motor when fluid under pressure is admitted through the port communicating with the face or end apertures of said gear passageways in which case the fluid pressure chamber between gear teeth communicates with the passageways having outlet through a circumferential portion of the gear tooth and outwardly through the adjacent port.

Other objects and advantages of this invention will be more fully set forth in the accompanying drawings which are selected for the purpose of broadly disclosing a generic embodiment of the idea susceptible of many specific variations and adaptations depending upon the application of the principles of construction and mode of operation herein disclosed.

In the accompanying drawings, the device as a pump is illustrated as comprising an enclosing fluid-tight casing 1, provided with legs or supports, consisting of two parallel intersecting cylinders 3, 4, each of which forms a partial gear housing. This casing constitutes a unitary housing for an intermeshing pair of gears 5, 6, the open ends of which are enclosed by plates 7, 8, secured to the casing by bolts 9. Within the housing so formed is mounted the pair of intermeshing gears 4, 5, preferably spur gears, keyed or otherwise fixed to shafts 10, 11, having end bearings in the casing enclosure plates 7, 8.

The casing is provided with a port 12 preferably positioned in a medial circumferential portion of the casing adjacent the zone of gear intermesh having a fluid conduit 13, the interior of the casing thus providing a fluid chamber 14 in that portion of the casing traversed by the gear teeth adjacent the port 12, which may act either as an inlet or an outlet fluid port in a manner to be hereinafter disclosed. Each gear is provided with a plurality of recesses or fluid passageways 15, preferably but not necessarily, there being one recess for each of said teeth. These fluid passages provide in the gears, circumferential and end openings 16, 17, respectively arranged for coaction with respective casing ports, the circumferential apertures 16 operating in relation to casing port 12 and the end apertures 17 operating in relation to a casing port 18 formed through the closure plate 7, in either direction of gear rotation. In the preferred construction the circumferential aperture is placed upon one side of the crown of the tooth, i. e. upon the right-hand side of the tooth of the left-hand gear and the left-hand side of the tooth of the right-hand gear.

Also in the preferred construction and arrangement shown in Figure 4, the circumferential aperture is formed in a medial portion of the gear tooth, the opposite ends of this fluid passageway piercing the opposite end portions of the gear tooth. There is thus provided a series of fluid passages for the two gears which run in a general direction endwise of the gear or parallel to the axis but being open both at a circumferential portion of the gear or tooth and at one end or face portion of each gear. The fluid passageways through the gears thus provided enable a fluid to be passed into a peripheral or circumferential portion of the gear and outwardly through an end or face portion of the gear, or, conversely, into an end or face portion of the gear and outwardly through a circumferential portion of the tooth of the gear.

It will be understood that the end plates 7, 8, respectively, make a snug fit so as to just provide mechanical clearance in relation to the end faces of the spur gears and also that the peripheral or crown surfaces of the gear teeth similarly contact the inner peripheral surfaces of the gear casing, thus providing a fluid-tight chamber in the zone of intermesh adjacent the port 12 confining the fluid to the passageways rotatably presented by the gear teeth.

As shown, the end openings 17 on each gear are arranged concentrically to the gear center, the gears being equi-diameter, and the end or face plate casing port 18 is disposed for serial registration therewith. In the preferred construction, apertures 17 are near the crown of the teeth, describing intersecting circles, the casing port 18 having its center at a point corresponding to an intersecting point of the circles.

The operation of one of the shafts to rotate the gears in a direction shown in Figure 1 constitutes a fluid pump organization in which the circumferential openings are on the advance side of the gear teeth operating in the fluid chamber 14 of the casing to pass the fluid received through port 12 into the gear passageways and endwise outwardly of the same, each tooth discharging its portion of the contained fluid through the casing port 18 as an outlet, the other casing port 12, of course, being the inlet. If, now, instead of a pump it is desired to constitute a motor of the same organization, the fluid under pressure such as air or steam will be introduced through the casing port 18, entering the apertures 17 of the gear teeth, flowing endwise and inwardly toward the medial portion of the gearing through the gear passages and outwardly through the circumferential openings 16 of the gear teeth into the fluid chamber 14 and outwardly through the casing port 12 and conduit 13.

This rotor action whether considered as a motor or a pump is dependent upon the arrangement of the gear teeth and passageways providing, between the teeth prior to approaching or retreating from the line of full intermesh, a transient tooth fluid chamber 19, as indicated in Figure 1. When acting as a grease pump, for instance, the fluid supplied to the casing chamber 14 is gradually moved by the mating teeth into this transient or tooth chamber, the space being traversed by the mating tooth and operating to compress the fluid or force it under pressure into the circumferential aperture 16 and outwardly through the endwise aperture 17, each tooth delivering its charge of compressed fluid into the outlet casing port 18. Or, when acting as a motor, the fluid under pressure passes outwardly through the aperture 16 and by its expansion in the transient tooth chamber 19 or by reason of velocity, it imparts a rotative impulse to the gears in a direction reverse of that indicated in Figure 1, the fluid of course expanding, flowing into the casing chamber 14 and outwardly through the port 12 and conduit 13.

In the preferred embodiment illustrated in Figure 1, the casing ports 12 and 18 are both upon one side of the plane passing through the casing coincident with the common diameter of the two gears and it is, of course, this half of the casing which constitutes the fluid chamber, the other half of the casing being an empty chamber.

In order to eliminate or reduce back pressure to a minimum, I preferably provide the space shown in Figure 1 between the crown of the right-hand tooth and the adjacent wall of the left-hand tooth as the gears are advancing toward intermesh, and which opening obtains prior to bringing the axial opening of that tooth into registration with the casing port 18, from which it follows that immediately a fluid pressure chamber is constituted by the closing in of this tooth against the adjacent wall of the mating tooth, that an end outlet is provided at the face end of the gear for the escape of the fluid. In the motor operation of the pump the fluid passes outwardly through this space.

It will be readily understood that the term "transient" or "tooth fluid chamber" is adopted for convenience and as indicating the characteristic closing in of this chamber by the mating gear teeth in the pump phase, or the gradual opening up of this chamber in the motor phase, such tooth chamber formed each time there is a full intermesh operating either as a compression or an expansion chamber accordingly as the fluid is admitted to one or the other of the two casing ports.

The embodiment of this inventive concept in its simplest form is characterized by a minimum of structure, there being really only two definite structural elements, the gear casing and the intermeshing gears. It is the organized relationship of the casing ports, gear passageways and casing and tooth fluid chambers to each other and to this elemental structure which comprises the actual invention.

It is not the purpose nor proper for this application to claim all the subject matter necessarily pertaining to such a broad disclosure. Other phases of the invention and other embodiments thereof will be covered by subsequent or divisional applications. More specific invention pertains to the pump or motor phases or to other applied uses and, also later applications will cover subject matter pertaining to preferred construction and arrangement of gear teeth or the relative dimensions and contours of gear teeth, passageways and ports, as well as to various positional relationships.

Having described my invention, I claim:

1. A fluid pressure pump comprising a fluid-tight housing and a pair of intermeshing gears having bearings therein, the teeth of said gears being each formed with a series of fluid passages running approximately radially and axially thereof, the casing being formed with one port positioned for communication with peripheral portions of the gear tooth passages, and a second port positioned for communication with axial portions of the passages, said housing confining the fluid in relation to said gear passages.

2. A fluid pressure pump comprising a fluid-tight housing and a pair of intermeshing gears having bearings therein, the teeth of said gears being each formed with a series of fluid passages running entirely through the gears in directions approximately radial and axial thereof, the casing confining the fluid in relation to said passages and gear teeth and being formed with a circumferential port and an end port, communicating during gear rotation with the terminals of the radial and axial passages respectively as the gears move into intermesh for discharging the fluid trapped between the teeth.

3. A fluid pump comprising a pair of intermeshing gears, and a housing therefor formed with an inlet and an outlet fluid port, said gears being formed with fluid conduits through the teeth and gears having opposing terminals communicating with the housing ports during gear rotation, the gear teeth while moving to full intermesh providing a fluid pressure chamber traversed by a tooth presenting a passageway for the fluid.

4. A fluid pump comprising a pair of intermeshing gears, and a housing therefor formed with an inlet and outlet fluid port, both of said ports being upon the same side of plane of common diameter of the gears, the teeth of said gears being each formed with fluid conduits through the teeth and gears having opposing terminals communicating with the casing ports during gear rotation, the gear teeth while moving to or from full intermesh providing a successive series of fluid pressure chambers traversed by a tooth presenting a passageway for the fluid.

5. The combination of a pair of intermeshing gears formed with fluid passageways extending from a circumferential or tooth to an end or face portion thereof, and an enclosing casing constituting a confined fluid compartment upon one side of the plane of complete tooth intermesh, and formed with ports communicating serially with the circumferential and gear face terminals of said passageways, the gear teeth being contoured and the passageways disposed to constitute a sequence of transient fluid pressure sub-chambers active in the fluid compartment of the casing intermediate said ports to receive a fluid charge from one port and deliver it to the other in either direction of gear rotation.

6. The combination of a casing formed with two ports, and a pair of intermeshing rotatable gears the teeth thereof formed with fluid passageways providing circumferential and end openings, arranged to alternately coact with said casing ports, the successive intermeshing of gear teeth intermediate said ports presenting, in the zone of intermesh, a sequence of tooth-defined compartments traversed by the entering tooth and constituting a transient fluid pressure chamber supplied through one casing port and in communication with the other casing port when the mating teeth move to or from the line of full intermesh.

7. A fluid pump comprising a pair of intermeshing gears the teeth thereof formed with fluid passages one end of which terminates in a portion of the gear tooth and the other end of which terminates in a face portion of the gear, and a fluid-tight gear casing confining the fluid to spaces between intermeshing gear teeth, said gear casing being formed with ports communicating with the passageways constituted by the rotating gears.

8. A fluid pump comprising a pair of intermeshing gears formed with fluid passages one end of which terminates in a peripheral portion of the gear tooth and the other end of which terminates in a face portion of the gear, and a fluid-tight casing confining the fluid to spaces between intermeshing gear teeth, said casing being formed with inlet and outlet ports communicating with the passageways serially and successively constituted by the rotating gears, the peripheral openings of said gear passageways communicating with fluid pressure compartments formed between intermeshing gear teeth in either direction of gear rotation.

9. A pump comprising intermeshing gear teeth formed with fluid passageways providing circumferential and end openings, and a casing having a fluid-tight bearing upon the end faces of the gearing and upon crown portions of the gearing teeth constituting a casing chamber confining the fluid to the zone of tooth intermesh upon one side of the gearing, said fluid chamber of the casing being formed with a port serially communicating with the circumferential gear passageways, said casing being also formed with a second port communicating with an end passageway of the gearing, the openings to the circumferential passageways being positioned between the root and crown of the gear teeth respectively, to operate as inlet or outlet gear ports in said fluid compartment of the casing, the serial intermesh of mating teeth constituting transient fluid sub-chambers intermediate said casing ports communicating with such circumferential passageways as the teeth move to or from the line of full intermesh, whereby the fluid received from one or the other of said casing ports is carried in a successive series of charges through the fluid pressure chamber transiently constituted by the gear intermesh and is delivered correspondingly to one or the other of said casing ports.

10. A fluid pressure pump comprising a plurality of members adapted to constitute successively pressure chambers, said members comprising two intermeshing spur gears, two end plates disposed against the ends of said spur gears, recesses in the teeth of said spur gears, said recesses provided with openings adjacent to the crowns of the teeth, said recesses provided also with openings remote from the crowns of said teeth, and a port registering with said remote openings successively, each one coming into registry as the tooth for the recess of which it serves as an opening comes into partial mesh.

11. A fluid pressure pump comprising two intermeshing spur gears, passageways extending from a point adjacent to the crown of each gear tooth to a point remote therefrom, plates disposed against the ends of said gears on either side, so that the partial intermeshing of each gear tooth produces a substantial closure, and a port disposed to register successively with the remote ends of the passageways extending from the crowns of the gear teeth when each tooth is partially intermeshed with the opposing gear.

12. A fluid pressure pump comprising two intermeshing gears, each gear provided with a plurality of separate recesses, one for each tooth, each recess provided with one circumferential opening and one remote therefrom, a port adapted to register with each remote opening when the circumferential recess opening is adjacent to the opposing gear, and means producing fluid pressure within the recesses in said gears while in registry with said port.

13. A fluid pump comprising a gear casing formed with two ports, and a pair of intermeshing gears rotatable therein and having substantially fluid-tight bearings with the casing walls save in the zone of tooth intermesh which latter compartment communicates with one of said casing ports, the gears being formed with fluid conduits providing openings registering intermediately of and successively with said casing ports during gear rotation, the teeth being formed to intermeshingly define transient fluid pressure chambers communicating with said gearing conduits, whereby the fluid contents of said transient chambers supplied through either one of said ports is discharged through the other port in either direction of gear rotation.

14. A fluid pump comprising intermeshing gear wheels, a fluid-tight housing encasing and providing bearings for said gears, gear teeth providing circumferential openings and fluid passageways upon the right-hand side of the crown of one tooth and the left-hand side of the crown of the mating tooth, and providing openings also endwise of the tooth, the casing being formed with one port communicating circumferentially with the gear tooth passageways and another port serially communicating with the endwise tooth passageways, the gear teeth being arranged to constitute transient fluid chambers when moving to or from the full line of intermesh communicating with one or the other of said casing ports in relative order determined by the direction of gear rotation.

15. In a fluid pump, a pair of intermeshing gears, a fluid-tight casing providing bearings for the gearing and confining the fluid to the action of the gears, the casing being formed with a port in the zone of gear intermesh coacting circumferentially with the gear teeth, and also being formed with a port coacting with an end or face portion of the gears, two or more of the gear teeth being formed with fluid passages extending endwise for coaction with the second named casing port but providing circumferential openings upon that side of the crown of the opposing gear teeth respectively which faces the first named casing port for coacting therewith, enabling a fluid to flow in either direction through said casing and tooth passageways, whereby the fluid is caused to act upon the rotor in one direction of gear rotation and to be acted upon by the rotor in the reverse direction of gear rotation.

16. In combination with a pump casing having intake and discharge ports, a pair of intermeshing gears rotating within the casing, the crown and end surfaces of the teeth of the gears having fluid-tight bearings in their arc of rotation with the casing surfaces beyond said intake port, and each tooth having a flank cavity communicating with a port at an end face of the tooth, the tooth port with the rotation of the gears moving into registry with the casing discharge port during tooth intermesh for discharging the fluid entrapped between the teeth.

In witness whereof, I hereunto subscribe my name.

CLYDE G. BUTLER.